//]: #

United States Patent [19]

Florea et al.

[11] 4,159,296
[45] Jun. 26, 1979

[54] PROCESS FOR PRODUCING PELLETIZED KAOLIN CLAY

[75] Inventors: Timothy G. Florea; Charles R. Price, both of Macon, Ga.

[73] Assignee: J. M. Huber Corporation, Locust, N.J.

[21] Appl. No.: 852,900

[22] Filed: Nov. 18, 1977

[51] Int. Cl.$^2$ .............................................. B01J 2/12
[52] U.S. Cl. ...................................... 264/115; 264/117
[58] Field of Search ................................. 264/117, 115

[56] References Cited
U.S. PATENT DOCUMENTS

| 3,277,218 | 10/1966 | Dollinger | 264/117 |
| 3,406,426 | 10/1968 | Probst, Jr. et al. | 264/117 |

Primary Examiner—Robert F. White
Assistant Examiner—James R. Hall
Attorney, Agent, or Firm—Harold H. Flanders

[57] ABSTRACT

A process for making densified kaolin clay pellets of high bulk density, good handling and bulk flow properties, and low moisture content is disclosed. The process consists essentially of mixing substantially dry kaolin clay with water to bring the total moisture content of the finely divided kaolin clay to from about 17% to about 26% by weight based on the weight of said dry kaolin clay during mixing in a first pin mixer, followed by micropulverization, and subsequent pelletization by pin mixing. The pellets are dried to 1% or less moisture content by weight based on the weight of dry kaolin clay.

7 Claims, 1 Drawing Figure

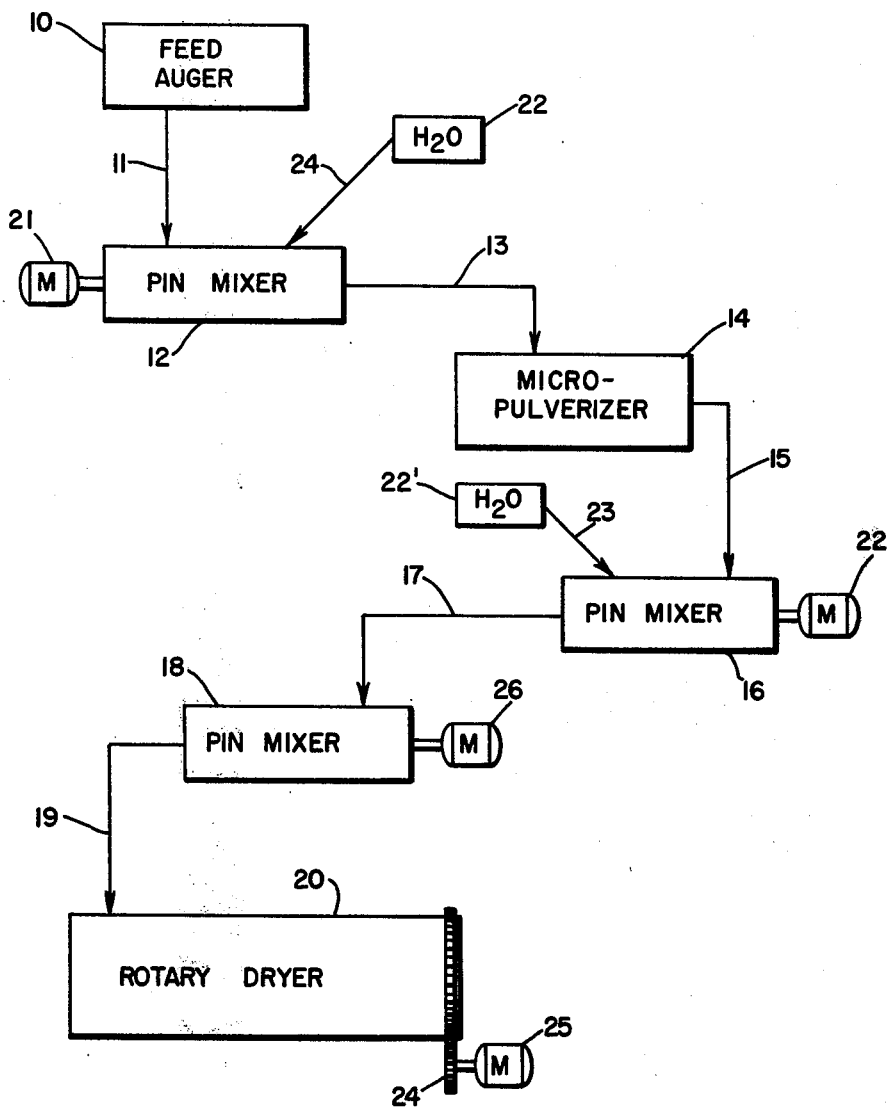

PROCESS FOR PRODUCING PELLETIZED KAOLIN CLAY

BACKGROUND OF THE INVENTION

In general, the present invention relates to the pelletization of kaolin clay.

The prior art has repeatedly addressed the problem of producing kaolin clay pellets of suitable hardness and durability with high bulk density, good handling and bulk flow properties and low moisture content. Heretofore, the results obtained have not been entirely satisfactory.

SUMMARY OF THE INVENTION

Accordingly, it is an object of this invention to provide a new, highly effective method which overcomes the deficiencies of the prior art.

It is a further object of the present invention to provide a new process for densifying kaolin clay.

Another object of the present invention is to produce kaolin clay pellets of high bulk density.

Still another object of the present invention is to produce kaolin clay pellets having good handling and bulk flow properties.

Another object of the present invention is to produce a better kaolin clay pellet.

An additional object of the present invention is to produce a pellet size distribution in a desirable, narrow range.

A further object of the present invention is to produce a hard, durable pellet of kaolin clay having a low moisture content.

Other objects and a further understanding of the present invention may be had by referring to the following description and claims taken in conjunction with the accompanying drawing.

The present invention overcomes the deficiencies of the prior art and achieves its objectives by mixing substantially dry kaolin clay in a first pin mixer with an added quantity of water supplied in the form of a fine spray in an amount sufficient to bring the total moisture content of the finely divided kaolin clay to from about 17% to about 26% by weight based on the weight of dry kaolin clay. After such mixing in a pin mixer, the kaolin clay is micropulverized. Following micropulverization the kaolin clay is pelletized in a second pin mixing means and thereafter dried to 1% or less moisture content on a weight basis based on the weight of dry kaolin clay.

BRIEF DESCRIPTION OF THE DRAWING

In order to facilitate the understanding of the present invention, reference will now be made to the appended drawing of a preferred embodiment of the present invention. The drawing should not be construed as limiting the invention, but is exemplary only. The drawing is a block schematic diagram of the process of the preferred embodiment of the present invention.

DESCRIPTION OF THE PREFERRED EMBODIMENTS

A preferred embodiment of the present invention is shown in the appended drawing. A substantially constant supply of substantially dry kaolin clay is passed by feed auger 10 into pin mixer 12 by line 11. The substantially dry kaolin clay is mixed in pin mixer 12 with water which is added by a spray 24 in the form of a fine spray or mist. Water is supplied to spray 24 from a suitable supply source 22. Spray 24 serves to provide a fine spray or mist of water directly into and within the working chamber of pin mixer 12 where the kaolin clay is being worked and mixed. Pin mixer 12 is operated in a conventional manner by a motor 21.

The wetted kaolin clay is then passed from pin mixer 12 by line 13 into a micropulverizer 14 where it is worked and micropulverized.

Following micropulverization in micropulverizer 14, the kaolin clay is then passed by line 15 to a second pin mixer 16 where it is pelletized. Pin mixer 16 is operated in a conventional manner by motor 22.

The pellets formed in pin mixer 16 may then be passed by line 17 to a third pin mixer 18 for further pelletization and polishing. Third pin mixer 18 is operated in a conventional manner by motor 26.

In normal operation, sufficient water for the process is added to pin mixer 12 to wet the clay. However, in optional embodiments, additional water may be added to pin mixer 16 via line 23 if necessary from source 22'.

It will be understood that the third pin mixing means is an optional embodiment in further pelletizing and polishing the pellets.

Upon passing from pin mixer 18, the pellets of kaolin clay are then passed by line 19 into a rotary dryer 20 which drys the pellets to a moisture content of 1% or less by weight based on the weight of the dry clay to provide the final product which upon passing from rotary dryer 20 may be conveyed to storage or to shipping. Operation of the rotary dryer is effected by gear means 24 driven by motor 25.

While water is referred to throughout as the preferred embodiment of the wetting agent, other suitable liquids or fluids may be used alone or in conjunction with water. Other such typical wetting agents include steam, a water-oil emulsion, a water-based solution of a molasses-type binder, organic or oleaginous liquids and combinations of the same with each other and with water. The water may be at ambient temperature or heated.

The amount of water added in pin mixer 12 is an amount sufficient to bring the total moisture content of the kaolin clay to from about 17% to about 26%, preferably from about 21% to about 25%, more preferably from about 22.5% to about 25%, and most preferably about 23%, all percentages by weight based on the weight of the dry kaolin clay.

While any suitable pin mixers may be employed, pin mixers such as described in U.S. Pat. No. 3,528,785 are preferred.

Pin mixer 12 is 14 feet long, has a 13 inch width, a 6 inch pitch, and ⅜ inch pin diameter. With a 7.5 horsepower motor, pin mixer 12 may be operated from 80 to 150 revolutions per minute. Typically 80 revolutions per minute are preferred.

Micropulverizer 14 may be a No. 4 "Mikro-Pulverizer" manufactured by MikroPul Corporation which may be operated at 1090 revolutions per minute and at 6163 feet per minute tip speed with a 30 horsepower motor. Alternatively micropulverizer 14 may be a No. 2 SCB Model manufactured by Pulverizing Machinery Company also driven with a 30 horsepower motor.

Pin mixer 16 is 10 feet long, 13 inches wide, has a 9 inch pitch and a ½ inch pin diameter. With a 5 horsepower motor, pin mixer 16 may be operated from 80 to 150 revolutions per minute, with 116 revolutions per minute preferred.

Rotary dryer 20 is a direct fired rotary dryer manufactured by the Hardinge Company. Rotary dryer 20 is 45 feet long with a 6 foot diameter. Rotary dryer 20 is operated at 2 revolutions per minute and has a 3 inch lift on a 45° angle in the last 25 feet of its 45 foot length.

Conventional feed augers, screw augers, conveying belts and the like are employed in passing the kaolin clay to and from each of the elements of equipment recited above in the process of the present invention.

Spray nozzle 24 may be a Bete Fog Nozzle which atomizes the water to spray a fine mist or fog of water to the kaolin clay.

To further facilitate the understanding of the present invention, reference will now be made to the following examples which should not be construed as limiting the invention but are exemplary only.

Control Example I

As a control for comparison, kaolin clay was pelletized in a pin mixer corresponding to pin mixer 18 operated at 190 revolutions per minute with the addition of 23% water. The pellets produced had the following pellet size distribution:
>5 mesh—58.4%
10 mesh—35.2%
20 mesh—5.1%
40 mesh—0.4%
60 mesh—0.4%
100 mesh—0.2%
Pan mesh—0.3%

Control Example II

As a further comparative control, 5% water by weight was added to kaolin clay in a pin mixer operated at 190 revolutions per minute by means of a Beta Fog Nozzle. The clay was then micropulverized and passed to a pin mixer operated at 190 revolutions per minute. Additional water in the amount of 18% was added in this second pin mixing operation to form pellets having the following distribution:
>5 mesh—60.4%
10 mesh—30.2%
20 mesh—8.1%
40 mesh—0.8%
60 mesh—0.2%
100 mesh—0.2%
Pan mesh—0.3%

The pellets of this example were observed to be non-uniform and no better in quality than those produced by pin mixing alone.

Example III

Kaolin clay was mixed in a pin mixer with 23% water by weight based on the weight of the dry clay and passed through a micropulverizer. The kaolin clay was then pelletized in a pin mixer operated at 190 revolutions per minute to yield the following pellet size distribution:
>5 mesh—0.80%
10 mesh—2.75%
20 mesh—28.90%
40 mesh—36.79%
60 mesh—19.00%
100 mesh—8.50%
Pan mesh—3.26%

Example IV

Kaolin clay was mixed in a pin mixer with 23% water by weight based on the weight of the dry clay and passed through a micropulverizer. The kaolin clay was then pelletized in a pin mixer operated at 190 revolutions per minute for one minute. The pellets were then dried to 1% moisture by weight. The pellets had the following screen analysis:
>5 mesh—2%
10 mesh—3%
20 mesh—18%
40 mesh—31%
60 mesh—20%
100 mesh—13%
Pan mesh—13%

The pellets were observed to have the desired degree of hardness and good flow and bulk handling characteristics. The pellet hardness of the pelletized kaolin clay was found to be from about 60 grams to about 110 grams. The bulk density of the pelletized kaolin clay was found to be from about 57 pounds per cubic foot to about 63 pounds per cubic foot as compared to a bulk density for pulverized kaolin clay of from 40 to 45 pounds per cubic foot. The rubber dispersion in synthetic rubber of the pelletized kaolin clay was found to be from about 89% dispersion to 99% dispersion as compared to 88% dispersion for a typical pulverized clay.

In operation, a substantially dry, finely divided kaolin clay is mixed in pin mixing means while adding sufficient water to bring the total moisture content of the finely divided kaolin clay to from about 17% to about 26% by weight based on the weight of the dry kaolin. The kaolin clay is then micropulverized and then pelletized in a second pin mixing means. The pelletized clay is then dried in a rotary dryer to 1% or less moisture content by weight based on the weight of the dry clay.

While the present invention has been described with reference to specific embodiments, the present application is intended to cover those various changes and substitutions which may be made by those skilled in the art without departing from the spirit and scope of the appended claims.

We claim:

1. A process for making densified kaolin clay pellets of high bulk density, good handling and bulk flow properties, and low moisture content by the steps comprising:
   (a) feeding substantially dry, finely divided kaolin clay to a first pin mixing means;
   (b) adding water in a fine spray to the kaolin clay to bring the total moisture content of the finely divided kaolin clay to about 17% to 26% by weight based on the weight of said dry kaolin clay, and working said moistened clay in said pin mixing means;
   (c) passing said kaolin clay from said first pin mixing means into a micropulverizing means;
   (d) micropulverizing said kaolin clay in said micropulverizing means;
   (e) passing said kaolin clay from said micropulverizing means into a second pin mixing means and forming pellets of said micropulverized kaolin clay;
   (f) passing said pelletized kaolin clay from said second pin mixing means into a rotary dryer means; and (g) drying said pellets to a moisture content of less than about 1% by weight based on the weight of said dry kaolin clay.

2. A process according to claim 1 wherein sufficient water is added to said first pin mixing means to bring the total moisture content of the finely divided kaolin clay to from about 20% to 25% by weight based on the weight of said dry kaolin clay.

3. A process according to claim 1 wherein sufficient water is added to said first pin mixing means to bring the total moisture content of the finely divided kaolin clay to from about 22.5% to 25% by weight based on the weight of said dry kaolin clay.

4. A process according to claim 1 wherein sufficient water is added to said first pin mixing means to bring the total moisture content of the finely divided kaolin clay to 23% by weight based on the weight of said dry kaolin clay.

5. A process according to claim 1 wherein additional water is added to said second pin mixing means, said additional water not exceeding an amount sufficient to maintain the total moisture content of the kaolin clay in the range of about 17% to about 26% by weight based on the weight of said dry kaolin clay.

6. A process according to claim 1 wherein the total water employed in pelletization of the kaolin clay is added to the said kaolin clay in said first pin mixing means.

7. A process according to claim 1 wherein said pelletized kaolin clay from said second pin mixing means is passed to a third pin mixing means prior to introduction into the rotary dryer, said third pin mixing means serving to further pelletize and polish said kaolin clay pellets.

* * * * *